US009058329B1

United States Patent
Rosenstein et al.

(10) Patent No.: US 9,058,329 B1
(45) Date of Patent: Jun. 16, 2015

(54) DERIVING ASSOCIATIONS BETWEEN ASSETS

(75) Inventors: David E. Rosenstein, San Francisco, CA (US); David G. King, Mountain View, CA (US); Kevin R G Montler, Pleasanton, CA (US)

(73) Assignee: GOOGLE INC., Mountain View, CA (US)

(*) Notice: Subject to any disclaimer, the term of this patent is extended or adjusted under 35 U.S.C. 154(b) by 77 days.

(21) Appl. No.: 13/267,670

(22) Filed: Oct. 6, 2011

(51) Int. Cl.
*G06F 17/30* (2006.01)
*G06Q 20/12* (2012.01)

(52) U.S. Cl.
CPC ...... *G06F 17/30017* (2013.01); *G06Q 20/1235* (2013.01)

(58) Field of Classification Search
CPC ............ G06F 17/30038; G06F 17/30047; G06F 21/10; G06F 17/30; G06F 17/30017; G06Q 30/00; G06Q 30/06; G06Q 20/1235
USPC .................................... 707/758, 781
See application file for complete search history.

(56) References Cited

U.S. PATENT DOCUMENTS

2003/0037010 A1* 2/2003 Schmelzer ............... 705/67
2007/0083558 A1* 4/2007 Martinez ............... 707/104.1

OTHER PUBLICATIONS

P2P File Sharing, Internet, retrieved at, http://www.p2p-weblog.com/50226711/altnet_launches_global_file_registry.php, 3 pages.
Altnet, Internet, retrieved at, http://www.globalfileregistry.com/assets/Global_File_Registry_White_Paper.pdf, May 26, 2006, 20 pages.

* cited by examiner

*Primary Examiner* — Vincent F Boccio
(74) *Attorney, Agent, or Firm* — Lowenstein Sandler LLP (57) ABSTRACT

A system and method for deriving associations between assets is disclosed. The system comprises a signature module, a matching module and an association module. These components of the system are communicatively coupled to each other. The signature module generates a first fingerprint for a first asset. The matching module determines a matching fingerprint that matches the first fingerprint from a candidate set. The matching module determines a first asset type for the first asset associated with the first fingerprint and a second asset type for a second asset associated with the matching fingerprint. The matching module determines an association test. The association module associates the first asset with the matching asset based on whether the association test is passed.

24 Claims, 7 Drawing Sheets

DERIVING ASSOCIATIONS BETWEEN ASSETS

BACKGROUND

The specification relates to data management systems. In particular, the specification relates to a system and method for deriving associations between assets.

Owners of intellectual property assets (e.g., compositions, songs, music videos, etc) desire to monetize these assets. As a result, they upload files containing these assets to online services that monetize these assets. Some of these assets are related to one another. For example, a composition uploaded to the online service is the musical composition for a song that is also uploaded to the online service. In another example, that same song might also have a music video uploaded to the online service. It is beneficial to know that these assets are related to one another for numerous reasons. For example, if a user is listening to a song while accessing the online service, they might also be interested in watching that song's music video. If this relationship is known to the online service, then they can make a suggestion to the user to watch the music video.

Unfortunately, many owners that upload assets to the online service do not provide data describing other related assets. Currently, the only way to solve this problem is to send a communication to the owner asking the owner to provide information describing the relationships between assets. However, owners frequently ignore these requests.

SUMMARY OF THE INVENTION

The specification overcomes the deficiencies and limitations of the prior art at least in part by providing a system and method for deriving associations between assets. A system and method for deriving associations between assets is disclosed. The system comprises a signature module, a matching module and an association module. These components of the system are communicatively coupled to each other. The signature module generates a first fingerprint for a first asset. The matching module determines a matching fingerprint that matches the first fingerprint from a candidate set. The matching module determines a first asset type for the first asset associated with the first fingerprint and a second asset type for a second asset associated with the matching fingerprint. The matching module determines an association test. The association module associates the first asset with the matching asset based on whether the association test is passed.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

A system and method for deriving associations between assets is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with nonvolatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code for deriving associations between assets will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

Figure 1:
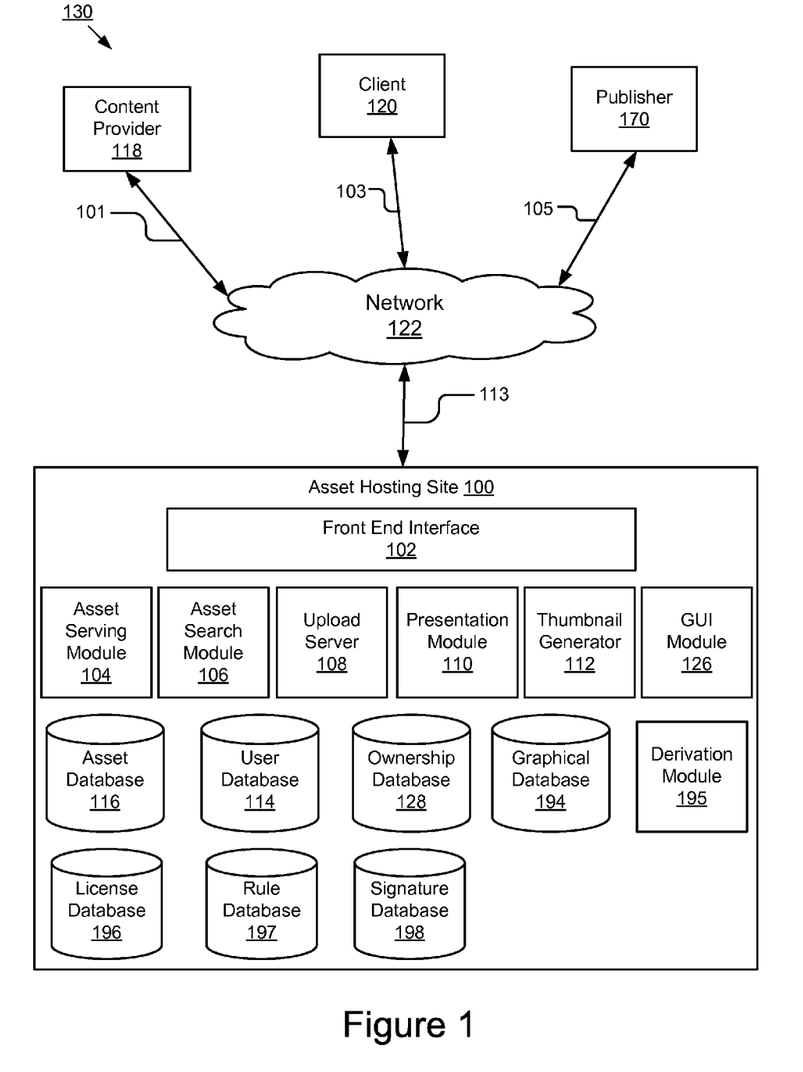
FIG. 1 is a high-level block diagram illustrating a system for deriving associations between assets according to one embodiment.

FIG. 1 is a high-level block diagram illustrating a system 130 for deriving associations between assets according to one embodiment. The illustrated embodiment of the system 130 includes an asset hosting site 100, a content provider 118, a client 120 and a publisher 170. These entities of the system 130 are communicatively coupled via a network 122. Although only one content provider 118, one client 120 and one publisher 170 are illustrated, one skilled in the art will recognize that any number of content providers 118, clients 120 and publishers 170 can be communicatively coupled to the network 122. Furthermore, while only one network 122 is coupled to the client 120, the content provider 118 and the publisher 170, one skilled in the art will appreciate that any number of networks 122 can be connected to these entities shown in FIG. 1.

The network 122 is a conventional type of network, wired or wireless, and may have any number of configurations such as a star configuration, token ring configuration or other configurations known to those skilled in the art. In one embodiment, the network 122 comprises one or more of a local area network (LAN), a wide area network (WAN) (e.g., the Internet), and/or any other interconnected data path across which multiple devices communicate. In another embodiment, the network 122 is a peer-to-peer network. The network 122 is coupled to or includes portions of a telecommunications network for sending data in a variety of different communication protocols. For example, the network is a 3G network or a 4G network. In yet another embodiment, the network 122 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 122 are encrypted using conventional encryption technologies such as secure sockets layer (SSL), secure HTTP and/or virtual private networks (VPNs).

In the illustrated embodiment, the asset hosting site 100 is communicatively coupled to the network 122 via signal line 113. The content provider 118 is communicatively coupled to the network 122 via signal line 101. The client 120 is communicatively coupled to the network 122 via signal line 103. The publisher 170 is communicatively coupled to the network 122 via signal line 105.

The asset hosting site 100 is any system that allows a user to access an intellectual property asset via searching and/or browsing interfaces. An example of an asset hosting site 100 is the YOUTUBE™ website, found at www.youtube.com. Other asset hosting sites are known as well, and are adapted to operate according to the teachings disclosed herein. It will be understood that the term "web site" represents any computer system adapted to serve content using any internet working protocols, and is not intended to be limited to content uploaded or downloaded via the Internet or the HTTP protocol.

In one embodiment, the asset hosting site 100 is configured to receive and share all or a portion of an intellectual property asset. Examples of an intellectual property asset include, but are not limited to a composition, an audio recording, a music video, etc. Those skilled in the art will recognize that an intellectual property asset can be represented in any media type and/or file type. For example, the asset hosting site 100 shares intellectual property assets such as a text file (e.g., one or more compositions of songs), an audio file (e.g., one or more audio recordings of songs), a file that includes a combination of video and audio (e.g., one or more videos such as music videos), etc. A file that includes a combination of video and audio is referred to as an "audio-video file" hereinafter. An intellectual property asset is referred to as "an asset" or "an asset file" hereinafter.

In one embodiment, sources of assets provided by the asset hosting site 100 are from uploads of assets by users (e.g., record labels, personal users, etc.), searches or crawls of other web sites or databases of assets, or the like, or any combination thereof. For example, in one embodiment, an asset hosting site 100 is configured to allow uploads of assets by users. In another embodiment, the asset hosting site 100 is configured to only obtain assets from other sources by crawling such sources or searching such sources in real time.

In the illustrated embodiment, the asset hosting site 100 includes: a front end interface 102; an asset serving module 104; an asset search module 106; an upload server 108; a presentation module 110; a thumbnail generator 112; a user database 114; an asset database 116; a graphical user interface module 126 ("GUI module 126"); an ownership database 128; a graphical database 194; a license database 196; a rule database 197; a signature database 198 and a derivation module 195.

The components of the asset hosting site 100 are communicatively coupled to each other. For example, the components are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the asset hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by clients 120 or other entities in other embodiments if appropriate. In one embodiment, the functionality attributed to a particular component is performed by different or multiple components operating together.

In one embodiment, each of the various servers and modules is implemented as a server program executing on a server-class computer comprising one or more central processing units ("CPU," or "CPUs" if plural), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory ("RAM"), flash, hard disk, optical/magnetic media, or solid-state drive ("SSD"), etc.).

The front end interface 102 is an interface that handles communication with one or more of the content provider 118, the client 120 and the publisher 170 via the network 122. For example, the front end interface 102 receives an asset uploaded from the content provider 118 and delivers the asset to the upload server 108. In one embodiment, the front end interface 102 receives requests from users of the client devices 120 and delivers the requests to the other components of the asset hosting site 100 (e.g., the asset search module 106 or the asset serving module 104). For example, the asset is a video and the front end interface 102 receives a video search query from a user and sends the video search query to the asset search module 106.

The upload server 108 receives one or more assets from the content provider 118 via the front end interface 102. For example, the upload server 108 receives one or more of a text file, audio-video file and an audio file from the content provider 118. In one embodiment, the upload server 108 processes the one or more assets and stores the processed assets in the asset database 116. The upload server 108 assigns an asset identification ("asset ID") to the stored asset. An asset ID includes identifiers for compositions ("a composition ID"), audio recordings ("a song ID"), audio-videos ("a music video ID"). For example, the upload server 108 assigns a music video ID to a file for a music video and stores the music video together with the music video ID in the asset database 116. In other embodiments, the upload server 108 performs one or more of: formatting an asset; compressing an asset; metadata tagging an asset; content analysis; fingerprinting an asset, etc.

In one embodiment, when a content provider 118 uploads a composition to the asset hosting site 100, the content provider 118 also uploads an audio file that is a music performance of what the composition sounds like when played by one or more musicians. The music performance may be a performance of all or part of the composition. This audio file is assigned a "performance ID." In one embodiment, the derivation module 195 determines a fingerprint (e.g., an audio signature) for the audio file uploaded with the composition and stores the fingerprint and the associated performance ID in the signature database 198.

In one embodiment, the performance ID is configured so that the composition ID for the corresponding composition can be determined from the performance ID. For the example, the performance ID is a hash of the composition ID using a known key. Persons having skill in the art will recognize that there are other ways of configuring the performance ID so that the composition ID for the corresponding composition can be determined from the performance ID.

For the purpose of clarity, the audio file uploaded with the composition is referred to herein as a performance file.

The asset database 116 is a storage system that stores assets shared by the asset hosting site 100 with the users. In one embodiment, the asset database 116 stores the assets processed by the upload server 108. In another embodiment, the asset database 116 also stores metadata associated with the assets. The metadata includes one or more of: an owner of the asset; a title; a description; tag information; a time length; and the like. In one embodiment, some or all of the metadata of the assets is provided by the content provider 118. For example, a user of the content provider 118 provides a title and a description of an asset when uploading the asset to the asset hosting site 100.

The asset search module 106 is code and routines that, when executed by a processor (not pictured), processes any search queries received by the front end interface 102 from users. A search query received by the front end interface 102 from a user includes search criteria such as keywords that identify an asset the user is interested in. The asset search module 106 uses the search criteria to query the metadata of the asset stored in the asset database 116. The search results for the query are returned to the front end interface 102 for presentation to the user. For example, if a user provides the front end interface 102 with a keyword search query, the asset search module 106 identifies an asset stored in the asset database 116 related to the keyword and returns the search result (e.g., asset IDs and/or metadata such as titles, descriptions, thumbnails of the identified assets) to the front end interface 102.

The asset serving module 104 is code and routines that, when executed by a processor (not pictured), processes requests for an asset (e.g., a composition, audio recording, music video, any other type of video, etc) and provides the asset to users. For example, the asset serving module 104 receives a query from a user via the front end interface 102, retrieves a set of music videos from the asset database 116 based at least in part on the query and presents the set of music videos to the user via the front end interface 102.

In one embodiment, the asset serving module 104 receives a request from a user to access an asset when the user clicks on a link to the asset. The request received from the user includes the asset ID of the asset that the user wishes to access. In one embodiment, the asset ID is included automatically in the request once the user clicks on the link for the asset. The asset serving module 104 uses the asset ID to search and locate the asset in the asset database 116. Once the requested asset is located, the asset serving module 104 transmits the asset to the user via the front end interface 102. The asset is presented to the user on a web page. Metadata associated with the asset is also presented with the asset, such as the title and description of the asset. In one embodiment, the asset serving module 104 stores the asset ID of the asset in the user database 114 after sending the asset to the user so that an asset access history of the user is stored in the user database 114.

The user database 114 is a storage system that stores data and/or information associated with a user. For example, the user database 114 stores the asset IDs of assets uploaded by a user to the asset hosting site 100 and the asset IDs of assets that the user has accessed from the asset database 116. In one embodiment, the user is identified by using a login name and password and/or by using the user's internet protocol ("IP") address.

The thumbnail generator 112 is code and routines that generates a thumbnail for an asset. A thumbnail is a picture that represents an asset in the asset hosting site 100. For example, assume the asset is a video (e.g., a music video). The thumbnail generator 112 analyzes the video and selects a frame of the video as the thumbnail. In one embodiment, the thumbnail generator 112 provides one or more pictures for the video and the user uploading the video to the asset hosting site 100 selects one picture as the thumbnail.

The ownership database 128 is a storage system that stores the ownership information. The ownership information includes one or more of the following: an identifier of an entity owning a right for an asset (e.g., a name of an owner); an identifier of the territory in which the ownership of a right applies; a percentage of ownership of a right claimed by the entity; an identifier of an administrator (e.g., a name of the administrator) that sets an administrative policy for a right; a policy assigned to one or more rights for the asset set by the administrator; a timestamp; and one or more geographic identifiers of the owner of a right.

A right for an asset includes one of a public performance right, a reproduction right, a distribution right, a synchronization right ("a sync right") and a right to make a derivative work. Rights for an asset are territory specific. For example, a first entity may own the distribution right for an asset in the territory of the United States while, at the same time, a second entity owns the distribution right for the same asset in a different territory such as Brazil, India, China, Japan, etc.

The GUI module 126 is code and routines that, when executed by a processor (not pictured), provides graphical data for generating a GUI used by a human user to input ownership information. For example, the GUI module generates graphical data for providing a GUI to a publisher 170, allowing a human user operating on the publisher 170 to edit ownership information of an asset. The GUI module 126 is configured to transmit the graphical data to the front end interface 102. In one embodiment, the GUI module 126 stores the graphical data in the graphical database 194. The front end interface 102 communicates with the network 122 to transmit the graphical data to a processor-based computing device communicatively coupled to the network 122. For example, the front end interface 102 transmits the graphical data to the client 120. The client 120 receives the graphical data and generates a GUI displayed on a display device (e.g., a monitor) communicatively coupled to the processor-based computing device. The GUI is displayed on a display device and viewed by a human user operating on the client 120.

The graphical database 194 is a non-transitory computer-readable storage medium that stores graphical data used to provide one or more user interfaces. For example, the graphical database 194 stores graphical data generated by the GUI module 126.

The license database 196 is a non-transitory computer-readable storage medium that stores license data. The license data describes the existing licensing agreements owned by the administrator of the asset hosting site 100. For example, the license data describes the various rights licensed for an asset such as a composition, audio file or audio-video file. In one embodiment, the license data includes data describing whether one or more of the assets has been 100% cleared. For example, if the asset is a music video, the license data describes whether the administrator of the asset hosting site 100 has licensed all the rights necessary in order to stream the music video to a user such as the client 120 and in which jurisdictions the music video can be streamed based on the existing licenses for the music data.

The signature database 198 is a is a non-transitory computer-readable storage medium that stores fingerprint data for one or more reference audio files and/or reference video files. A reference audio file is any audio file whose identity is known. A reference video file is any audio-video file whose identity is known. The fingerprint data is data describing an audio signature for the reference audio file or the reference audio portion of the audio-video file. In one embodiment, the content provider 118 provides the reference audio file and/or the reference audio-video file. The derivation module 195 generates a fingerprint for the reference audio file and/or the reference audio-video file. The derivation module 195 stores the fingerprint in the signature database 198. In another embodiment, the fingerprint is stored with a fingerprint ID that identifies the fingerprint and is similar to the content ID. In another embodiment, the fingerprint is stored with the content ID for the asset that was used to generate the fingerprint. The content ID can then be used to retrieve or otherwise identify the asset associated with the fingerprint having that content ID.

After processing by the derivation module 195, the reference audio file and the reference audio-video file are processed by the upload server 108 like other uploaded assets and then stored in the asset database 116. In this way, for one or more of the fingerprints in the signature database 198 there is a corresponding asset in the asset database 116.

In one embodiment, the content provider 118 uploads a fingerprint to the asset hosting site 100 and the derivation module 195 does not need to determine a fingerprint. The uploaded fingerprint is stored in the signature database 198. In one embodiment, the fingerprint ID is assigned to the uploaded fingerprint and the fingerprint ID and fingerprint are stored in the signature database 198.

The rule database 197 is a non-transitory computer-readable storage medium that stores fingerprint rules for determining whether two or more fingerprints match. For example, a first fingerprint rule is that first fingerprint for a song is determined to match a second fingerprint for a music video if a comparison of the fingerprints shows that 90% or more of the song is in the audio-portion of the audio-video file for the music video. In one embodiment, the first fingerprint rule requires that the 80% of the music video include a sound recording. In other words, the audio portion of the audio-video file for the music video must have music for 80% of the video portion of the audio-video file for the music video. This subcomponent of the first fingerprint rule allows for the possibility that the music video may include a introduction or closing that does not include music. Persons having skill in the art will recognize other fingerprint rules for determining whether fingerprints match. Persons having ordinary skill in the art will also recognize how such rules can be used to match a fingerprint for a performance file for a composition to a fingerprint for either a song or a music video.

The derivation module 195 is code and routines for deriving associations between assets. For example, assume there are two assets. The first asset is a song stored as an audio file. The second asset is a music video that is stored as an audio-video file. The music video is a music video for the first asset. Assume the content provider 118 is a music label that uploaded both the song and the music video. However, the music label did not provide data to the asset hosting site 100 explicitly describing the link between the song and the music video, i.e., the music label did not provide data to the asset hosting site 100 explicitly describing that the music video is a music video for the song. Prior systems are not able to determine that the song is linked to the music video. However, the derivation module 195 overcomes the deficiencies of prior systems. For example, assume that the song is uploaded and that a fingerprint for the music video is stored in the signature database 198. The derivation module 195 generates a first fingerprint for the song. The derivation module 195 queries the signature database 198 for a second fingerprint for a music video matching the first fingerprint. The derivation module 195 retrieves a candidate set of one or more fingerprints for music videos that at least partially match the first fingerprint. The derivation module 195 determines based on the fingerprint rules described above for the rule database 197 which of the fingerprints included in the candidate set is the best match for the first fingerprint. In this way, the derivation module 195 derives which of the fingerprints from the candidate set is a match for the first fingerprint; this fingerprint is referred to herein as the "matching fingerprint." The derivation module 195 determines that the music video associated with the matching fingerprint is a music video for the song associated with the first fingerprint. In this way the derivation module 195 determines that a song is linked to a music video.

In one embodiment, the derivation module 195 provides some or all of the functionality described below with reference to FIGS. 4A-4C and FIG. 5.

The content provider 118 is any device that provides assets to the asset hosting site 100. For example, the content provider 118 is a computing device that uploads an asset to the asset hosting site 100. In one embodiment, the content provider 118 is also one of a music label, the author, or artist or any entity having rights to upload a song to the asset hosting site 100.

In one embodiment, the content provider 118 is configured to operate a computing device to perform various content provider functions. Examples of the content provider functions include, but are not limited to: uploading an asset to the asset hosting site 100; editing an asset stored by the asset hosting site 100; removing an asset from the asset hosting site 100; editing content provider preferences associated with an asset; and identifying a link between two or more assets stored by the asset hosting site 100, etc.

The client 120 is any processor-based computing device. The client 120 executes client software such as a web browser or built-in client application and connects to the asset hosting site 100 via the network 122. In one embodiment, the client 120 includes a variety of different computing devices. Examples of a client device 120 include, but are not limited to: a personal computer; a personal digital assistant; a television set-up box; a tablet computer; a cell phone (e.g., a smart phone); and a laptop computer. The client 120 comprises a processor (not pictured), a memory (not pictured) and other components conventional to a computing device.

In one embodiment, the client 120 is configured as a content provider 118 to provide assets to the asset hosting site 100. In another embodiment, the client 120 is the publisher 170. In yet another embodiment, the client 120 is configured to retrieve assets stored by the asset hosting site 100. For example, the client 120 includes an embedded video player (e.g., the Flash™ player from Adobe System, Inc.) adapted for the video content formats used in the asset hosting site 100 so that a user is able to view a video from the asset hosting site 100 using the embedded video player. In yet another embodiment, the client 120 is a service provider for providing one or more services to other users.

The publisher 170 is any entity that publishes an asset. In one embodiment, the publisher 170 is any processor-based computing device that publishes an asset on a website, an application store, etc. In another embodiment, the publisher 170 refers to a human user that operates the computing device to publish the asset without causing any confusion. In one embodiment, the publisher 170 owns one or more rights for an asset in a specified territory and is able to issue a license for the right in the territory. For example, the publisher 170 owns a reproduction right for a video in the United States and has the power to issue a license for the reproduction right for the video in the United States. In one embodiment, the publisher 170 can own and issue licenses for any other rights for the asset. In yet another embodiment, the publisher 170 owns a portion of a right for an asset in a specified territory. For example, the publisher 170 owns 50% of a distribution right of a video in the United States.

Derivation Module

Figure 2:
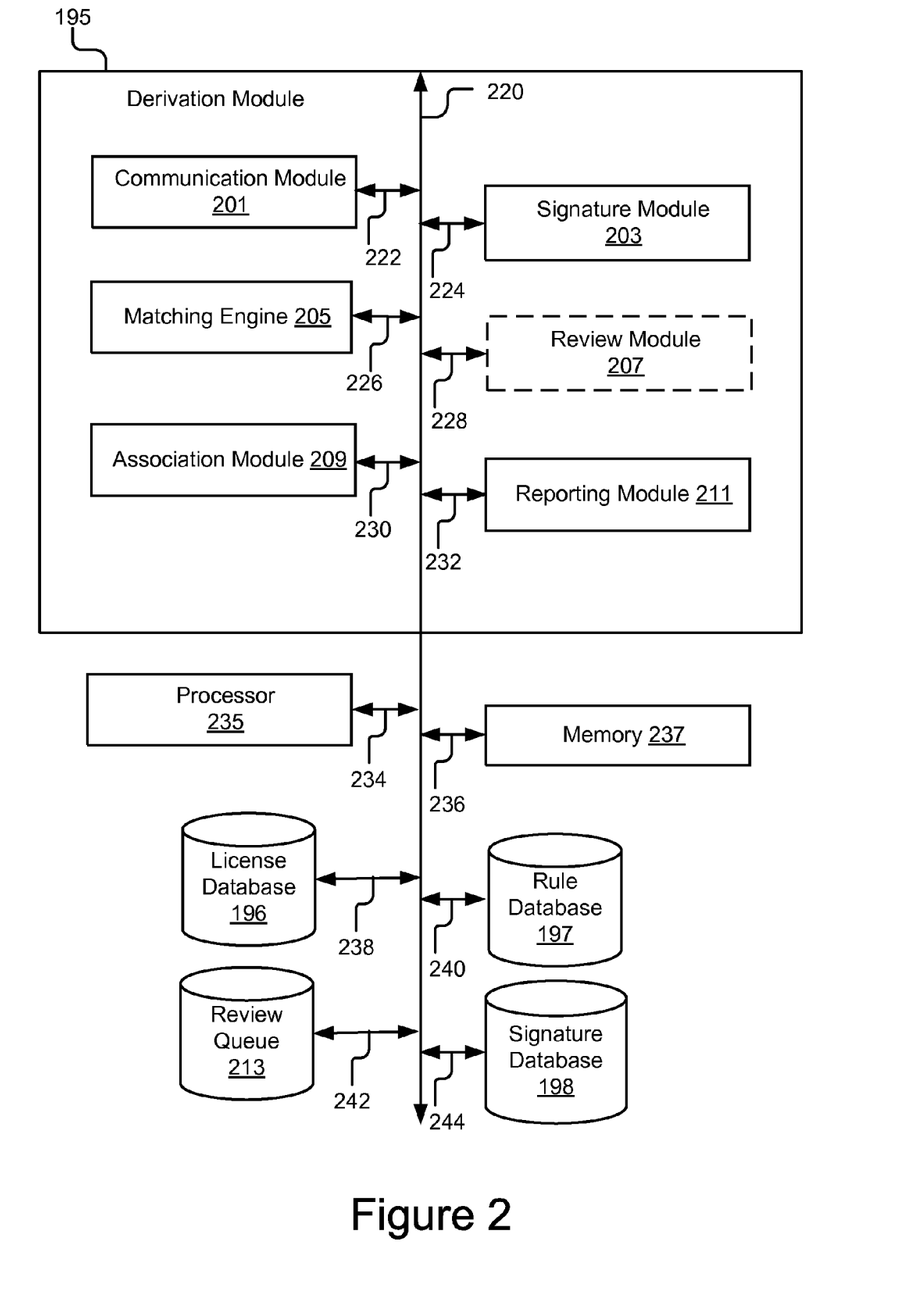
FIG. 2 is a block diagram illustrating a derivation module according to one embodiment.

Referring now to FIG. 2, the derivation module 195 is shown in more detail. FIG. 2 is a block diagram illustrating the derivation module 195 according to one embodiment. The processor 235 comprises an arithmetic logic unit, a microprocessor, a general purpose controller or some other processor array to perform computations, retrieve data stored on the memory 237, etc. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 234.

The memory 237 stores instructions and/or data that are executed by the processor 235. The memory 237 is communicatively coupled by the bus 220 for communication with the other components of derivation module 195. In one embodiment, the instructions and/or data comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a compact disc read only memory (CD-ROM) device, a digital versatile disk read only memory (DVD-ROM) device, a digital versatile disk random access memories (DVD-RAM) device, a digital versatile disk rewritable (DVD-RW) device, a flash memory device, or some other non-volatile storage device known in the art. The memory 237 is communicatively coupled to the bus 220 via signal line 236.

The derivation module 195 comprises a communication module 201, a signature module 203, a matching engine 205, a review module 207, an association module 209 and a reporting module 211. The components of the derivation module 195 are communicatively coupled to each other via the bus 220. In one embodiment, the derivation module 195 is implemented using hardware such as field-programmable gate arrays ("FPGAs") or application-specific integrated circuits ("ASICs"). One skilled in the art will recognize that the derivation module 195 may include different modules and/or components to provide the functionality described herein.

The communication module 201 is code and routines that, when executed by the processor 235, handles communication between components of the derivation module 195 and other components of the asset hosting site 100. The communication module 201 also handles communication between a signature module 203, a matching engine 205, a review module 207, an association module 209 and a reporting module 211. In the depicted embodiment, the communication module 201 is communicatively coupled to the bus 220 via signal line 222.

The communication module 201 receives one or more files for an asset. The file includes one or more of an audio file, an audio-video file or a file containing a fingerprint for an audio file or an audio-video file. If the communication module 201 receives an audio file or an audio-video file, then the communication module 201 sends the received file to the signature module 203. If the communication module 201 receives a file containing a fingerprint, then the communication module 201 stores the fingerprint in the signature database 198. The signature database 198 is communicatively coupled to the bus 220 via signal line 244.

In one embodiment, the communication module 201 receives the one or more files for an asset from one of the front end interface 102 or the upload server 108. The upload server 108 assigns an asset ID to the asset. The asset file is later stored in the asset database 116 along with the asset ID. The asset ID can be used to retrieve the asset file to which it was assigned. In one embodiment, the communication module 201 is communicatively coupled to the matching engine 205 to communicate the asset ID to the matching engine 205.

In one embodiment, the asset ID is also associated with a fingerprint stored in the signature database 198 and is used to retrieve fingerprints stored in the signature database 198. For example, a first fingerprint for a music video is stored in the signature database 198 with a music video ID for the music video. The music video ID can then be used to determine that the first fingerprint is associated with an asset file that is a music video. This is beneficial for numerous reasons, including for example, as described in more detail below the matching engine 205 uses the asset ID stored in the signature database 198 to query the signature database 198 for fingerprints associated with an asset type. For example, assume the matching engine 205 is matching a song to a corresponding music video so that these two assets can be linked. The matching engine 205 has received a first fingerprint for a song. Because the first fingerprint is for a song, the matching engine 205 queries the signature database 198 for fingerprints having a music video ID since this will return results for fingerprints generated based on music videos. As described in more detail below, the matching engine 205 determines which of the returned fingerprints is the best match for the first fingerprint based on one or more of the fingerprint rules stored in the rule database 197. The rule database 197 is communicatively coupled to the bus 220 via signal line 240.

In one embodiment, the signature database 198 is configured so that it can be queried using a fingerprint. Persons having skill in the art will recognize that querying the signature database 198 using a fingerprint will return more accurate results than, for example, a keyword search.

In one embodiment, the signature database 198 is configured to be queried for fingerprints having a specified type of asset ID. For example, the signature database 198 is configured so that the matching engine 205 can query the signature database 198 for fingerprints having a specified asset ID type. Assume the matching engine 205 requires fingerprints for music videos. The matching engine 205 queries the signature database 198 to return fingerprints having a music video ID.

In one embodiment, the signature database 198 is configured so that the matching engine 205 can query the signature database 198 using a fingerprint and an asset ID type so that the signature database 198 returns fingerprints that are (1) similar to the queried fingerprint and (2) have a specified asset ID type. For example, assume the matching engine 205 requires fingerprints for music videos. The matching engine 205 queries the signature database 198 using a fingerprint for a song and asset ID type. The signature database 198 returns fingerprints that are both similar to the song and have a music video ID.

In one embodiment the asset ID is used to determine which fingerprints in the signature database 198 are associated with which asset files in the asset database 116.

In one embodiment, the communication module 201 receives a batch of files for two or more assets and processes the files in the batch accordingly.

In one embodiment, the communication module 201 retrieves a first asset from the asset database 116. For example, the communication module 201 queries the asset database 116 for the first asset. The first asset is an asset to be linked to a matching asset. In one embodiment, the first asset is a performance file for a composition to be linked to an audio file for a song that is a matching asset. In another embodiment, the first asset is an audio file for a song to be linked to an audio-video file for a music video that is a matching asset. In yet another embodiment, the first asset is an audio-video file for a music video to be linked to an audio file for a song that is a matching asset. Whether a file is a matching asset is based at least in part on the fingerprint rules described above.

The signature module 203 is code and routines that, when executed by the processor 235, generates a fingerprint for one or more of an audio file and an audio-video file. As described above, in one embodiment a fingerprint is an audio signature for an audio file. For audio-video files, the fingerprint is an audio signature for the audio portion of the audio-video file. Persons having skill in the art will recognize that other fingerprints are possible for audio files and audio-video files.

In one embodiment, the signature module 203 is communicatively coupled to the bus 220 via the signal line 224. Thus, the signature module 203 is communicatively coupled to the communication module 201 via the bus 220 to receive an asset file from the communication module 203. The signature module 203 is also communicatively coupled to the matching engine 205 via the bus 220 to send the generated fingerprint to the matching engine 205.

The matching engine 205 is code and routines that, when executed by the processor 235, matches a first fingerprint for a first asset against fingerprints stored in the signature database 198 to determine a candidate set of one or more fingerprints stored in the signature database 198. The signatures in the candidate set are possible matches for the first fingerprint. The matching engine 205 retrieves one or more matching rules from the rule database 197. The matching engine 205 determines based at least in part on the one or more fingerprint rules which of the fingerprints in the candidate set are the best match for the first fingerprint. The matching engine 205 determines that the fingerprint that is the best match is the "matching fingerprint." Persons having skill in the art will recognize that the matching fingerprint may not be a perfect match for the first fingerprint. For example, the matching fingerprint is a fingerprint that is a 90% match for the first fingerprint.

In one embodiment, the type of signatures retrieved from the signature database 198 is based at least in part on the asset type of the first asset. For example, as described above for the signature module 203 and the signature database 198, the fingerprints stored in the signature database 198 are stored with an asset ID of the content of the asset file used to generate the fingerprint. The matching engine 205 receives a first fingerprint from the signature module 203 and an asset ID for the first fingerprint. The asset ID identifies the type of asset that was used to generate the first fingerprint. If the asset ID is for a music video, then the matching engine 205 queries the signature database 198 for fingerprints having a song ID. If the asset ID is for a song, then the matching engine 205 queries the signature database 198 for fingerprints having a music video ID. If the asset ID is for a performance file, then the matching engine 205 queries the signature database 198 for fingerprints having a song ID.

The result of querying the signature database 198 is a candidate set. In one embodiment, the matching engine 205 queries the signature database 198 for assets of a specified asset ID type. The fingerprints returned by this query are the candidate set. The matching engine 205 compares these fingerprints to the first fingerprint using the fingerprint rules. The matching engine 205 determines the matching fingerprint based at least in part on the fingerprint rules.

In another embodiment, the matching engine 205 queries the signature database 198 using the asset ID type and the first fingerprint. The returned candidate set includes fingerprints that are (1) similar to the first fingerprint and (2) have an asset ID type matching the asset ID type specified by the matching engine 205. The matching engine 205 compares these fingerprints to the first fingerprint using the fingerprint rules. The matching engine 205 determines the matching fingerprint based at least in part on the fingerprint rules.

In one embodiment, the matching engine 205 receives an input from an administrator of the derivation module 195 and the matching fingerprint is determined based at least in part on the input.

In one embodiment, the fingerprints stored in the signature database 198 are stored with metadata describing the asset used to generate the fingerprint. For example, if the fingerprint is generated using a song, the metadata describes the composer, performing artist, year of recording, etc. The signature database 198 is configured to be queried based on the metadata so that the signature database 198 returns results having metadata matching the query. The matching engine 205 receives metadata for the first fingerprint from the upload server 108. The matching engine 205 queries the signature database 198 using the metadata. Persons having skill in the art will recognize that this query can query the database for one or more of the first fingerprint and the asset ID type. The signature database 198 returns a candidate set of fingerprints having the specified metadata. The matching engine 205 compares these fingerprints to the first fingerprint using the fingerprint rules. The matching engine 205 determines the matching fingerprint based at least in part on the fingerprint rules.

In one embodiment, the derivation module 195 is linking a composition to a song. The first fingerprint is a fingerprint for the performance file associated with the composition. The matching engine 205 generates a candidate set comprised of fingerprints for songs. The matching engine 205 determines that a fingerprint for a song from the candidate set is the matching fingerprint based at least in part on the fingerprint rules. The matching engine 205 analyzes the matching fingerprint to determine if 100% of the rights for the song associated with the matching fingerprint are cleared. As described above for the license database 196, in one embodiment the license data stored in the license database 196 includes data describing whether one or more of the assets has been 100% cleared. Thus, after applying the fingerprint rules and determining a fingerprint from the candidate set is the matching fingerprint, the matching engine 205 uses the asset ID for that fingerprint to query the license database 196 to determine if the asset corresponding to that fingerprint is 100% cleared. If the matching fingerprint is 100% cleared, then the matching engine 205 takes steps to communicate this determination to the association module 209 and the association module 209 associates the two assets. In one embodiment, if the asset is not 100% cleared, then the candidate set is communicated to the review module 207. The license database 196 is communicatively coupled to the bus 220 via signal line 238.

In one embodiment, the derivation module 195 is linking a song to a music video. The first fingerprint is a fingerprint for the song. The first fingerprint has an associated song ID that is also associated with the song. The matching engine 205 generates a candidate set comprised of fingerprints for music videos. The matching engine 205 determines that a fingerprint for a music video from the candidate set is the matching fingerprint based at least in part on the fingerprint rules. The matching engine 205 analyzes the matching fingerprint to determine if the song and the music video have a common owner. As described above for the upload server 108 and the asset database 116, metadata for uploaded assets is stored in the asset database 116 and the owner for the song and the music video are associated with each asset's asset ID. Thus, after applying the fingerprint rules and determining a fingerprint from the candidate set is the matching fingerprint, the matching engine 205 uses the asset ID for the matching fingerprint to determine the owner of the music video based on the music video ID for the matching fingerprint. For example, the matching engine 205 queries the asset database for the owner of the asset associated with the music video ID. Similarly, the matching engine 205 uses the asset ID for the first fingerprint to determine the owner of the song associated with the song ID for the first fingerprint. If the two assets have a common owner, then the matching engine 205 takes steps to communicate this determination to the association module 209 and the association module 209 associates the two assets. In one embodiment, if the assets do not have a common owner, then the candidate set is communicated to the review module 207.

Alternatively, in one embodiment the derivation module 195 is linking a music video to a song. The first fingerprint is a fingerprint for the music video. The first fingerprint has an associated music video ID that is also associated with the music video. The matching engine 205 generates a candidate set comprised of fingerprints for songs. The matching engine 205 determines that a fingerprint for a song from the candidate set is the matching fingerprint based at least in part on the fingerprint rules. The matching engine 205 analyzes the matching fingerprint to determine if the music video and the song have a common owner. After applying the fingerprint rules and determining a fingerprint from the candidate set is the matching fingerprint, the matching engine 205 uses the asset ID for the matching fingerprint to determine the owner of the song based on the song ID for the matching fingerprint. For example, the matching engine 205 queries the asset database 116 for the owner of the asset associated with the song ID. Similarly, the matching engine 205 uses the asset ID for the first fingerprint to determine the owner of the music video associated with the music video ID. If the two assets have a common owner, then the matching engine 205 takes steps to communicate this determination to the association module 209 and the association module 209 associates the two assets. In one embodiment, if the assets do not have a common owner, then the candidate set is communicated to the review module 207.

In one embodiment, the matching engine 205 is communicatively coupled to the bus 220 via the signal line 226. Thus, the matching engine 205 is communicatively coupled to the other elements of the asset hosting site 100 to exchange data with these elements via the bus 220.

The review module 207 is code and routines that, when executed by the processor 235, stores the candidate set in the review queue 213. In one embodiment, a human user manually reviews the candidate set to select a matching asset from the candidate set. The review module 207 is depicted in FIG. 2 to indicate that it is an optional feature of the derivation module 195.

In one embodiment, the review module 207 is communicatively coupled to the bus 220 via the signal line 228. Thus, the review module 207 is communicatively coupled to the other elements of the asset hosting site 100 to exchange data with these elements via the bus 220.

The association module 209 is code and routines that, when executed by the processor 235, creates an association between the first asset and the matching asset and stores the association in a medium such as the asset database 116. In one embodiment, the communication module 201 receives data from an owner of an asset modifying the association created by the association module 209. The communication module 201 communicates this input to the association module 209 and the association module 209 modifies the association accordingly.

In one embodiment, the association module 209 is communicatively coupled to the bus 220 via the signal line 230. Thus, the association module 209 is communicatively coupled to the other elements of the asset hosting site 100 to exchange data with these elements via the bus 220.

The report module 211 is code and routines that, when executed by the processor 235, creates a report describing the association between the first asset and the matching asset. The report module 211 communicates with the communication module 201 and/or the front end interface 102 to communicate this report to the owner of the first asset and/or the owner of the matching asset.

In one embodiment, the report module 211 is communicatively coupled to the bus 220 via the signal line 232. Thus, the report module 211 is communicatively coupled to the other elements of the asset hosting site 100 to exchange data with these elements via the bus 220.

The review queue 213 is a tangible computer-readable storage medium for storing a candidate set. The review queue 213 is communicatively coupled to the bus 220 via signal line 242.

Methods

Referring now to FIGS. 3 and 4A-4C, various embodiments of a method for linking assets are described.

Figure 3:
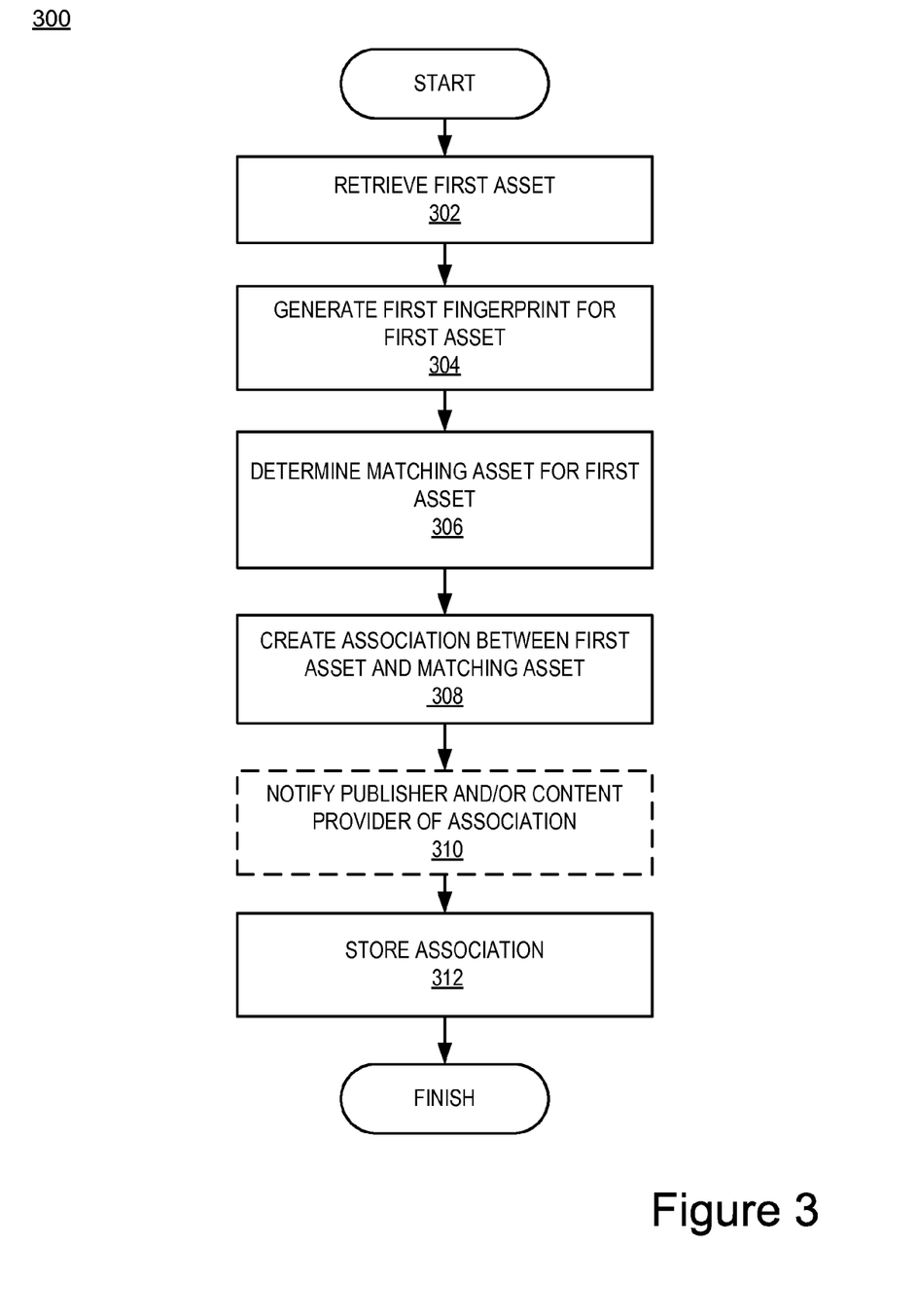
FIG. 3 is a flow diagram illustrating a method for deriving associations between assets according to one embodiment.

FIG. 3 is a flow diagram of a method 300 for linking assets according to one embodiment. At step 302, the communication module 201 retrieves a first asset from the asset database 116. The signature module 203 generates 304 a first fingerprint for the first asset. The matching engine 205 determines 306 a matching asset for the first asset based at least in part on the fingerprint rules. The matching asset is an asset associated with a matching fingerprint determined by the matching engine 205 to match the first fingerprint. The association module 209 creates 308 an association between the first asset and the matching asset. At step 310, the reporting module 211 generates a report describing the association created at step 308 and sends the report to one or more owners of the first asset and the matching asset. Step 310 is depicted with a dashed line to indicate that it is an optional feature of the method 300. The association module 209 stores 312 the association in the asset database 116.

Figure 4A:
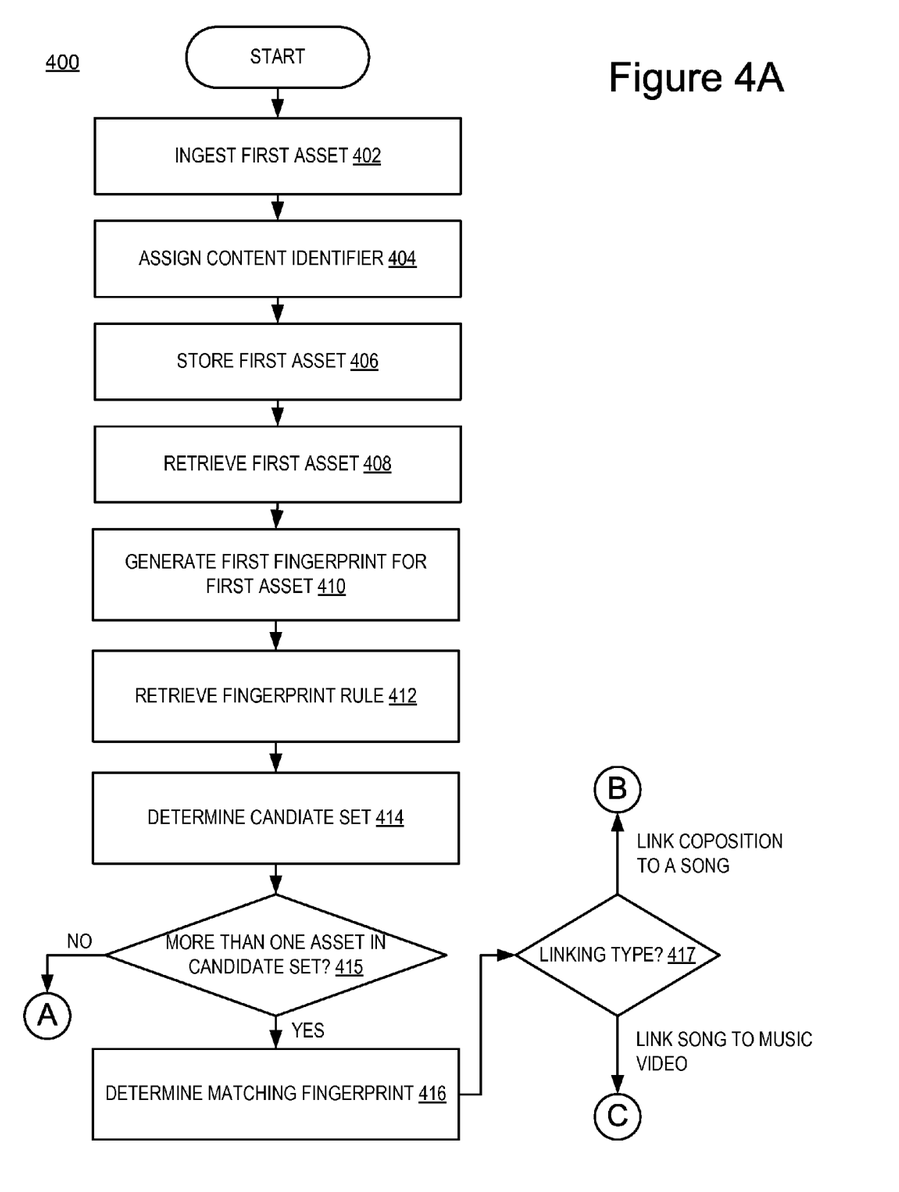
FIGS. 4A, 4B and 4C are flow diagrams illustrating a method for deriving associations between assets according to one embodiment.
Figure 4B:
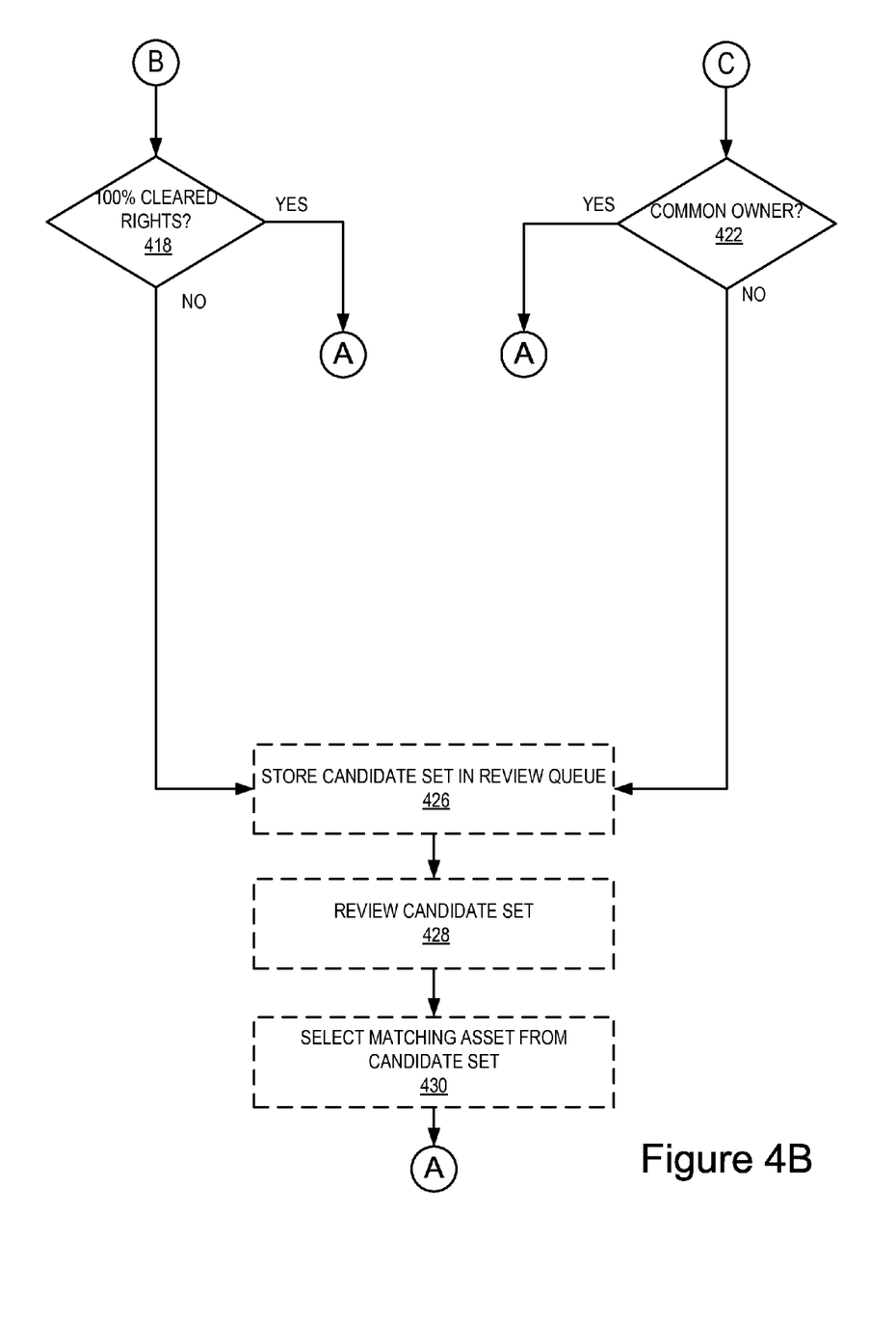
Figure 4C:
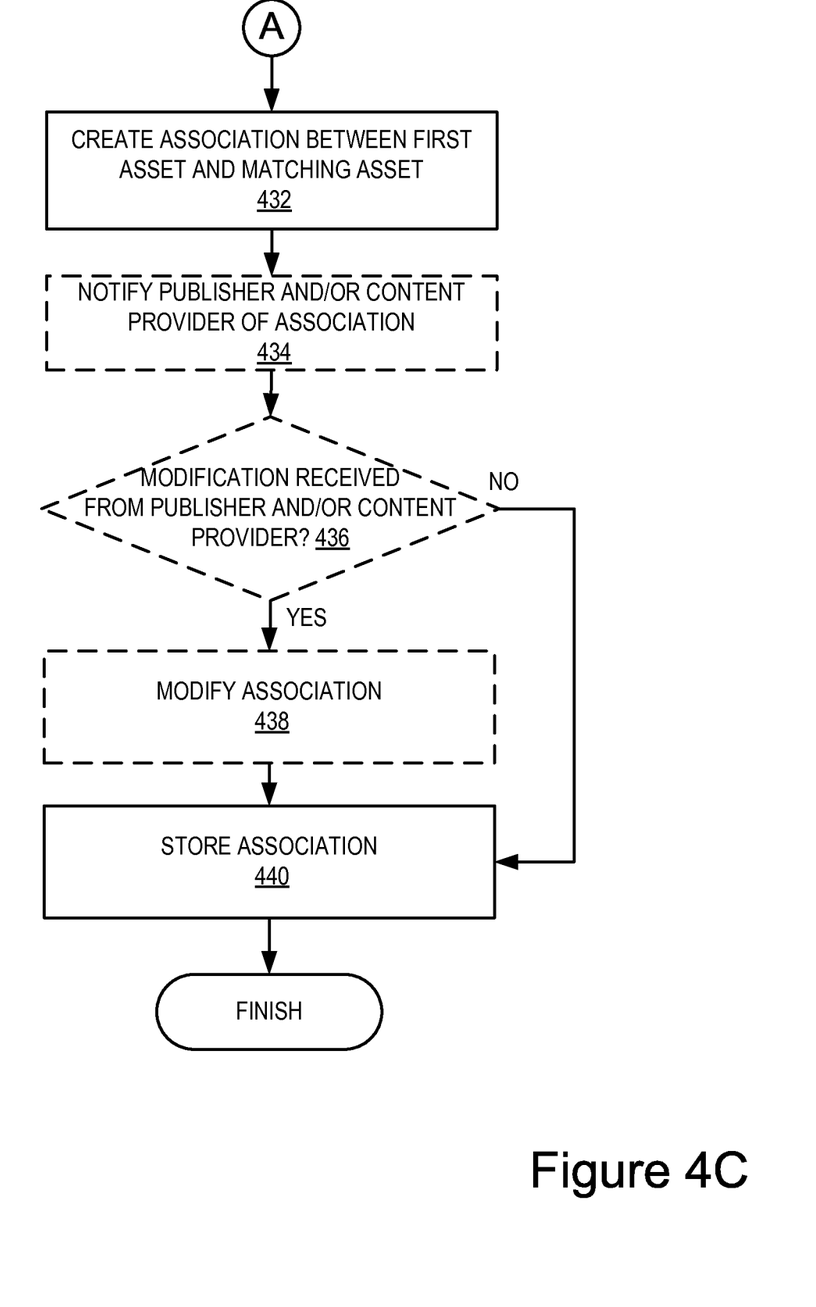

FIGS. 4A-4C are flow diagrams of a method 400 for linking assets according to one embodiment.

Turning to FIG. 4A, the asset hosting site 100 ingests 402 a first asset. The asset hosting site 100 assigns 404 a content identifier to the first asset. The asset hosting site 100 stores 406 the first asset.

At step 408, the communication module 201 retrieves a first asset from the asset database 116. The signature module 203 generates 410 a first fingerprint for the first asset. The matching engine 205 retrieves 412 a fingerprint rule from the rule database 197. The matching engine 205 queries the signature database 198 and determines 414 a candidate set. At step 415, if only one asset is in the candidate set, then the method 400 proceeds to step 432 depicted in FIG. 4C. If more than one asset is in the candidate set, the method 400 proceeds to step 416. At step 416, the matching engine 205 determines a matching fingerprint based on one or more of the fingerprint rules.

At step 417, the matching engine 205 determines what types of files are being linked. If a composition is being linked to a song, then the method 400 proceeds to step 418. If a song is being linked to a music video (or vice versa), then the method 400 proceeds to step 422.

At step 418, the matching engine 205 determines whether 100% of the rights for the matching asset are cleared. If 100% of the rights are cleared, the method 400 proceeds to step 432 depicted in FIG. 4C. If 100% of the rights are not cleared, the method 400 proceeds to step 426.

At step 422, the matching engine 205 determines if the first asset and the matching asset have a common owner. If the first asset and the matching asset have a common owner, the method 400 proceeds to step 432 depicted in FIG. 4C. If the first asset and the matching asset do not have a common owner, the method 400 proceeds to step 426.

In one embodiment, steps 418 and 422 are referred to individually or collectively as an "association test."

At step 426, the review module 207 stores the candidate set in the review queue 213. At step 428, the candidate set is reviewed to determine which of the fingerprints in the candidate set is the matching fingerprint. At step 430, the matching asset is selected from the candidate set. Steps 426-430 are depicted in FIG. 4B with boxes formed by dashed lines to indicate that they are optional steps in the method 400.

Turning to FIG. 4C, at step 432 the association module 209 creates an association between the first asset and the matching asset, thereby linking the two.

At step 434, the reporting module 211 generates a report describing the association created a step 432 and sends the report to one or more owners of the first asset and the matching asset. At step 436, the reporting module 211 determines whether a communication describing a modification of the association created at step 432 is received. If no communication is received at step 436, the method 400 proceeds to step 440. If a communication is received, the method moves to step 438. At step 438, the association module 209 modifies the association in accordance with the received communication modifying the association.

Steps 434, 436 and 438 are depicted with boxes formed by dashed lines to indicate that they are optional features of the method 400.

At step 440, the association module 209 stores the association created at step 432 in the asset database 116 and the method 400 ends.

Figure 5:
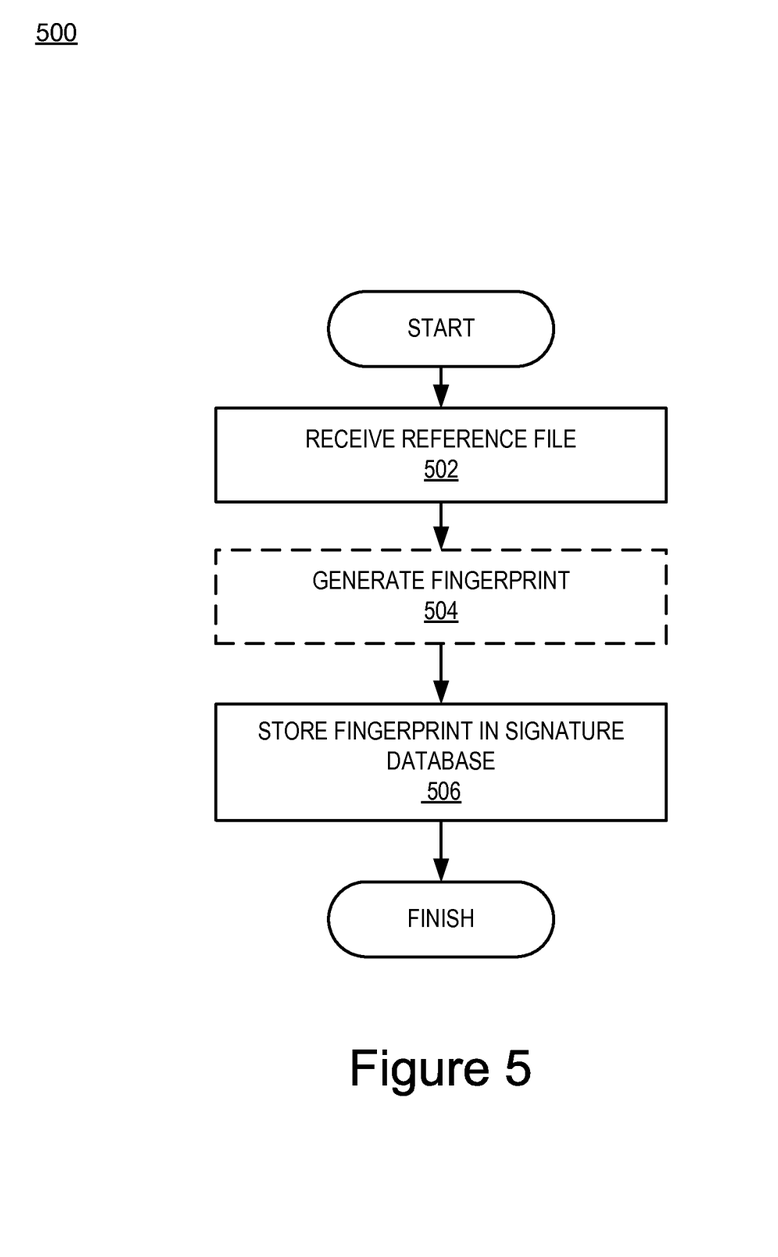
FIG. 5 is a flow diagram illustrating a method for populating a signature database according to another embodiment.

FIG. 5 is a flow diagram depicting a method 500 for populating the signature database 198 according to another embodiment. The front end interface 102 receives 502 a reference file. In one embodiment, the reference file includes one or more of a performance file, audio-video file and an audio file for an asset. In one embodiment, the reference file includes a fingerprint for a performance file, audio-video file and an audio file for an asset. If the reference file does not include a fingerprint, the derivation module 195 generates the fingerprint at step 504. At step 506, the derivation module 195 stores the fingerprint in the signature database 198. As described above, in one embodiment the fingerprint is stored with one or more of an asset ID for the asset used to generate the fingerprint, metadata describing the asset used to generate the fingerprint, etc.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for deriving associations between assets, the method comprising:
generating a first fingerprint for a first asset;
determining a first asset type for the first asset;
determining a second asset type that is different from the determined first asset type;
identifying a candidate set of fingerprints associated with a plurality of assets having the determined second asset type;
determining a matching fingerprint from the candidate set that matches at least a portion of the first fingerprint based at least in part on one or more fingerprint rules;
determining a second asset associated with the matching fingerprint;
determining an association test based on the first asset type and the second asset type;
creating an association between the first asset and the second asset based on whether the association test is passed, wherein the first asset and the second asset have at least one non-matching content portion that corresponds to the second asset type but not first asset type;
transmitting a notification of the association to a computer device of a user associated with the second asset;
receiving, from the computer device, an indication that the first asset is associated with the user; and
modifying the association between the first asset and the second asset based on the received indication.

2. The method of claim 1, wherein the first asset is at least partially incorporated in the second asset and the association test includes determining whether the second asset has a right to at least partially incorporate the first asset.

3. The method of claim 1, wherein the second asset is at least partially incorporated in the first asset and the association test includes determining whether the first asset has a right to at least partially incorporate the second asset.

4. The method of claim 1, wherein responsive to determining that the first asset type is a composition and the second asset type is a song, the association test determines whether all rights for the second asset are cleared and the association test is passed when all rights for the second asset are cleared.

5. The method of claim 1, wherein responsive to determining that the first asset type is a song and the second asset type is a music video, the association test is determining whether the first asset and the second asset have a common owner and the association test is passed when the first asset and the second asset have the common owner.

6. The method of claim 1, wherein responsive to determining that the first asset type is a music video and the second asset type is a song, the association test is determining whether the first asset and the second asset have a common owner and the association test is passed when the first asset and the second asset have the common owner.

7. The method of claim 1, further comprising notifying an owner of the first asset and an owner of the second asset of the association.

8. The method of claim 7, further comprising receiving a communication from one of the owner of the first asset and the owner of the second asset describing a modification for the association between the first asset and the second asset and modifying the association between the first asset and the second asset based at least in part on the communication.

9. A computer program product comprising a non-transitory computer usable medium including a computer readable program, wherein the computer readable program when executed on a computer causes the computer to perform steps comprising:

generating a first fingerprint for a first asset;
determining a first asset type for the first asset;
determining a second asset type that is different from the determined first asset type;
identifying a candidate set of fingerprints associated with a plurality of assets having the determined second asset type;
determining a matching fingerprint from the candidate set that matches at least a portion of the first fingerprint based at least in part on one or more fingerprint rules;
determining a second asset associated with the matching fingerprint;
determining an association test based on the first asset type and the second asset type;
creating an association between the first asset and the second asset based on whether the association test is passed, wherein the first asset and the second asset have at least one non-matching content portion that corresponds to one of the first or second asset type but not the other of the first or second asset type;
transmitting a notification of the association to a computer device of a user associated with the second asset;
receiving, from the computer device, an indication that the first asset is associated with the user; and
modifying the association between the first asset and the second asset based on the received indication.

10. The computer program product of claim 9, wherein the first asset is at least partially incorporated in the second asset and the association test includes determining whether the second asset has a right to at least partially incorporate the first asset.

11. The computer program product of claim 9, wherein the second asset is at least partially incorporated in the first asset and the association test includes determining whether the first asset has a right to at least partially incorporate the second asset.

12. The computer program product of claim 9, wherein responsive to determining that the first asset type is a composition and the second asset type is a song, the association test is determining whether all of rights for the second asset are cleared and the association test is passed when the all of the rights for the second asset are cleared.

13. The computer program product of claim 9, wherein responsive to determining that the first asset type is a song and the second asset type is a music video, the association test is determining whether the first asset and the second asset have a common owner and the association test is passed when the first asset and the second asset have the common owner.

14. The computer program product of claim 9, wherein responsive to determining that the first asset type is a music video and the second asset type is a song, the association test is determining whether the first asset and the second asset have a common owner and the association test is passed when the first asset and the second asset have the common owner.

15. The computer program product of claim 9, wherein the computer readable program when executed on the computer causes the computer to perform further steps comprising notifying an owner of the first asset and an owner of the second asset of the association.

16. The computer program product of claim 15, wherein the computer readable program when executed on the computer causes the computer to perform further steps comprising receiving a communication from one of the owner of the first asset and the owner of the second asset describing a modification for the association between the first asset and the second asset and modifying the association between the first asset and the second asset based at least in part on the communication.

17. A system for deriving associations between assets, the system comprising:
a memory;
a processing device, coupled to the memory;
a signature module, executed from the memory by the processing device, for generating a first fingerprint for a first asset;
a matching module communicatively coupled to the signature module to receive the first fingerprint from the signature module, wherein the matching module is configured to:
determine a first asset type for the first asset;
determine a second asset type that is different from the determined first asset type;
identify a candidate set of fingerprints associated with a plurality of assets having the determined second asset type;
determine a matching fingerprint from the candidate set that matches at least a portion of the first fingerprint based at least in part on one or more fingerprint rules;
determine a second asset associated with the matching fingerprint; and
determine an association test based on the first asset type and the second asset type; and
an association module communicatively coupled to the matching module to receive a communication from the matching module identifying the first asset and the second asset, wherein the association module is configured to:
create an association between the first asset and the second asset based on whether the association test is passed, wherein the first asset and the second asset have at least one non-matching content portion that corresponds to one of the first or second asset type but not the other of the first or second asset type;
transmit a notification of the association to a computer device of a user associated with the second asset;
receive, from the computer device, an indication that the first asset is associated with the user; and
modify the association between the first asset and the second asset based on the received indication.

18. The system of claim 17, wherein the first asset is at least partially incorporated in the second asset and the association test includes determining whether the second asset has the right to at least partially incorporate the first asset.

19. The system of claim 17, wherein the second asset is at least partially incorporated in the first asset and the association test includes determining whether the first asset has the right to at least partially incorporate the second asset.

20. The system of claim 17, wherein responsive to determining that the first asset type is a composition and the second asset type is a song, the association test is determining whether all of rights for the second asset are cleared and the association test is passed when the all of the rights for the second asset are cleared.

21. The system of claim 17, wherein responsive to determining that the first asset type is a song and the second asset type is a music video, the association test is determining whether the first asset and the second asset have a common owner and the association test is passed when the first asset and the second asset have the common owner.

22. The system of claim 17, wherein responsive to determining that the first asset type is a music video and the second asset type is a song, the association test is determining whether the first asset and the second asset have a common owner and the association test is passed when the first asset and the second asset have the common owner.

23. The system of claim 17, further comprising a reporting module for generating a report describing the association of the first asset and the second asset and sending the report to an owner of the first asset and an owner of the second asset.

24. The system of claim 23, wherein the association module is configured to receive a communication from one of the owner of the first asset and the owner of the second asset describing a modification for the association between the first asset and the second asset and the association module is configured to modify the association between the first asset and the second asset based at least in part on the communication from one of the owner of the first asset and the owner of the second asset.

* * * * *